United States Patent
Tsumagari et al.

(10) Patent No.: US 7,765,800 B2
(45) Date of Patent: Aug. 3, 2010

(54) EXHAUST GAS PURIFICATION APPARATUS

(75) Inventors: Ichiro Tsumagari, Hino (JP); Takatoshi Furukawa, Hino (JP); Yoshihide Takenaka, Hino (JP); Koichi Machida, Hino (JP); Shinya Sato, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 726 days.

(21) Appl. No.: 11/574,072

(22) PCT Filed: Aug. 22, 2005

(86) PCT No.: PCT/JP2005/015189

§ 371 (c)(1),
(2), (4) Date: Feb. 23, 2007

(87) PCT Pub. No.: WO2006/022213

PCT Pub. Date: Mar. 2, 2006

(65) Prior Publication Data

US 2007/0243115 A1    Oct. 18, 2007

(30) Foreign Application Priority Data

Aug. 23, 2004 (JP) ............................. 2004-242290
Aug. 23, 2004 (JP) ............................. 2004-242291
Sep. 1, 2004 (JP) ............................. 2004-253907

(51) Int. Cl.
  *F01N 3/10* (2006.01)
(52) U.S. Cl. ............................. 60/301; 60/286; 60/295; 60/297; 60/303
(58) Field of Classification Search ................. 60/274, 60/278, 280, 286, 287, 291, 292, 295, 296, 60/297, 301, 303, 311
See application file for complete search history.

(56) References Cited

U.S. PATENT DOCUMENTS 6,409,973 B1 * 6/2002 Kinugasa et al. ............. 422/171

(Continued)

FOREIGN PATENT DOCUMENTS

JP    2001 525902    12/2001

(Continued)

OTHER PUBLICATIONS

U.S. Appl. No. 11/574,109, filed Feb. 22, 2007, Sato.

(Continued)

*Primary Examiner*—Binh Q. Tran
(74) *Attorney, Agent, or Firm*—Oblon, Spivak, McClelland, Maier & Neustadt, L.L.P.

(57) ABSTRACT

Excessive generation $NO_2$ by oxidation catalyst arrangement upstream of a selective reduction catalyst is suppressed to prevent falling of $NO_x$ reduction rate.

A selective reduction catalyst 4 capable of selectively reacting $NO_x$ with ammonia even in the presence of oxygen is incorporated in an exhaust pipe 3 from an engine 1. A pair of oxidation catalysts 5A and 5B are arranged in parallel with each other and upstream of the selective reduction catalyst. In an operation condition with low exhaust temperature, amounts of the exhaust gas 2 distributed to the oxidation catalysts 5A and 5B are adjusted so as to make $NO/NO_2$ ratio in the exhaust gas 2 to about 1-1.5. In an operation condition with higher exhaust temperature where the $NO_x$ reduction rate is less affected by the $NO/NO_2$ ratio, as a countermeasure against increasing, leaking ammonia, passage changeover is conducted to pass the exhaust gas 2 in backflow through the selective reduction catalyst 4 and the oxidation catalysts 5A and 5B, so that ammonia passing through the selective reduction catalyst 4 without reacted is oxidized in the oxidation catalysts 5A and 5B.

2 Claims, 7 Drawing Sheets

U.S. PATENT DOCUMENTS

| | | | |
|---|---|---|---|
| 7,240,484 B2 * | 7/2007 | Li et al. | 60/286 |
| 7,264,785 B2 * | 9/2007 | Blakeman et al. | 423/213.2 |
| 7,331,170 B2 * | 2/2008 | Shimoda | 60/286 |
| 7,563,422 B2 * | 7/2009 | Jacob | 423/213.2 |

FOREIGN PATENT DOCUMENTS

| | | |
|---|---|---|
| JP | 2002 161732 | 6/2002 |
| JP | 2003 41927 | 2/2003 |
| JP | 2003 201825 | 7/2003 |
| JP | 2003 239728 | 8/2003 |
| JP | 2003 531721 | 10/2003 |
| JP | 2003 314251 | 11/2003 |

OTHER PUBLICATIONS

U.S. Appl. No. 11/574,109, filed Feb. 23, 2007, Sato.
U.S. Appl. No. 11/719,373, filed May 15, 2007, Sato et al.

* cited by examiner

EXHAUST GAS PURIFICATION APPARATUS

TECHNICAL FIELD

The present invention relates to an exhaust emission control device applied to a diesel or other engine.

BACKGROUND ART

Particulates or particulate matter from a diesel engine is mainly constituted by carbonic soot and a soluble organic fraction (SOF) of high-boiling hydrocarbon and contains a trace of sulfate (misty sulfuric acid fraction). In order to suppress such kind of particles from being discharged to atmosphere, conventionally a particulate filter is incorporated in an exhaust pipe through which exhaust gas flows.

This kind of particulate filter is constituted by a porous honeycomb structure made of ceramics such as cordierite and having lattice-like compartmentalized passages; alternate ones of the passages have plugged inlets and the remaining passages with unplugged open inlets are plugged at their outlets. Thus, only the exhaust gas passing through thin porous walls compartmentalizing the respective passages is discharged downstream.

The particulates in the exhaust gas, which are captured and accumulated on the inner thin porous compartment walls, require to be burned off so as to regenerate the particulate filter before exhaust resistance considerably increases due to clogging. However, the exhaust gas from the diesel engine in a normal operation condition rarely has a chance to obtain a temperature level at which the particulates ignite by themselves. Then, adoption of a catalytic regenerative particulate filter has been studied such as a particulate filter integrally carrying an oxidation catalyst of platinum or other precious metal or a particulate filter in combination with a separate upstream oxidation catalyst.

Adoption of such catalytic regenerative particulate filter will accelerate oxidation reaction of captured particulates to lower their ignition temperature, so that the particulates can be burned off at an exhaust temperature lower than ever before.

Meanwhile, in order to reduce $NO_x$ in the exhaust gas, there has been proposed a selective reduction catalyst incorporated in an exhaust pipe though which exhaust gas flows, said selective reduction catalyst having a feature of selectively reacting $NO_x$ with oxygen even in the presence of oxygen. A required amount of reducing agent is added upstream of the selective reduction catalyst to make reducing reaction with $NO_x$ (nitrogen oxides) in the exhaust gas on the catalyst, thereby reducing discharge concentration of $NO_x$.

Known as this kind of selective reduction catalyst having the above-mentioned feature is, for example, a catalyst of precious metal such as platinum or palladium or of basic metal such as vanadium oxides, copper oxides or ferrioxide. However, an active temperature area of such selective reduction catalyst is generally so small that, in fact, $NO_x$ can be reduced and purified only at a part of an exhaust temperature area of a diesel engine. Thus, expansion in active temperature area and especially enhancement in low-temperature activity of the selective reduction catalyst remain large tasks to be settled.

Then, the inventors devised to arrange an oxidation catalyst upstream of a selective reduction catalyst for oxidation of NO in an exhaust gas by the oxidation catalyst into highly oxidative $NO_2$, such highly oxidative $NO_2$ being guided to the selective reduction catalyst for acceleration of the reducing reaction on the catalyst by the reducing agent, thereby attaining the reducing reaction even at a temperature area lower than that in usual single use of a selective reduction catalyst (see, for example, Reference 1).

[Reference 1] JP2002-161732A

Effectiveness of ammonia ($NH_3$) used as a reducing agent for reduction and purification of $NO_x$ is well-known in a field of industrial flue gas denitration, for example, in a plant. However, in a field of automobile where safety is hard to assure as to running with ammonia itself being loaded, researches have been made nowadays on use of nontoxic urea water as a reducing agent.

SUMMARY OF THE INVENTION

Problems to be Solved by the Invention

However, the inventors keenly researched to find out that, while an oxidation catalyst arranged upstream of a selective reduction catalyst contributes to low-temperature activity of the selective reduction catalyst, this kind of oxidation catalyst has peaked catalytic characteristic with its peak at a predetermined exhaust temperature and $NO_x$ reduction rate falls due to excessive generation of $NO_2$ at or near the exhaust temperature forming such peak.

More specifically, the urea water added to the selective reduction catalyst receives heat in the exhaust gas after its addition and is decomposed in accordance with the formula $$(NH_2)_2CO+H_2O \rightarrow 2NH_3+CO_2 \qquad \text{Formula 1}$$

into ammonia and carbon dioxide, and $NO_x$ is reduced and purified by the ammonia. Though NO occupies most of $NO_x$ in the exhaust gas, $NO_2$ is increased due to the oxidation catalyst to accelerate the reducing reaction with the following formula having highest reaction speed $$NO+NO_2+2NH_3 \rightarrow 2N_2+3H_2O \qquad \text{Formula 2}$$

into satisfactory reduction of $NO_x$.

It is important for such acceleration of the reducing reaction that $NO/NO_2$ ratio in exhaust gas is substantially about 1-1.5. When $NO_2$ is excessively generated by the oxidation catalyst at a predetermined exhaust temperature, $NO_2$ proportion becomes greatly beyond NO proportion. Such excessive $NO_2$ is reacted by the formula $$6NO_2+8NH_3 \rightarrow 7N_2+12H_2O \qquad \text{Formula 3}$$

so that the reaction speed slows down to increase leaking ammonia which passes through the selective reduction catalyst without reacted, resulting in falling of $NO_x$ reduction rate at the predetermined exhaust temperature.

It is to be noted that, during $NO_2$ proportion being below NO proportion, $NO_x$ in the exhaust gas is reduced and purified also by the formula $$6NO+4NH_3 \rightarrow 5N_2+6H_2 \qquad \text{Formula 4}$$

or $$4NO+4NH_3+O_2 \rightarrow 4N_2+6H_2 \qquad \text{Formula 5}$$

The invention was made in view of the above and has its object, in upstream oxidation catalyst arrangement for generation of highly oxidative $NO_2$ to enhance low-temperature activity of a selective reduction catalyst, to suppress excessive generation of $NO_2$ due to the oxidation catalyst to prevent falling of $NO_x$ reduction rate.

Reactions for reduction and purification of $NO_x$, using ammonia ($NH_3$) as a reducing agent, are expressed by the following formulas:

 Formula 6

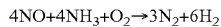 Formula 7

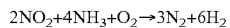 Formula 8

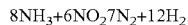 Formula 9

Since they are slower in reaction speed in the order named, it is desired that, in order to make reduction reaction with Formula 6 having fastest reaction speed, the ratio of NO to $NO_2$ in the exhaust gas be controlled to about 1:1 to attain satisfactory $NO_x$ reduction even at lower temperature as shown in FIG. 5. In FIG. 5, the solid line shows the $NO_x$ reduction rate when ratio of NO to $NO_2$ is about 1:1 and the broke line, the $NO_x$ reduction rate under usual condition.

Since almost all of $NO_x$ in exhaust gas is NO, generation of $NO_2$ from NO may be thought out for control of the ratio $NO/NO_2$. However, a catalyst for oxidation of NO into $NO_2$, which is temperature-dependent and is affected by an operation condition of an engine, may fail to control the ratio $NO/NO_2$.

Even if the ratio $NO/NO_2$ in exhaust gas is controlled to about 1:1 in use of a particulate filter for the exhaust gas treatment, soot of particulates accumulated in the particulate filter may react with $NO_2$ to make the ratio $NO/NO_2$ out of balance, failing in proper reduction of $NO_x$.

The invention was made in view of the above and has its object to provide an exhaust emission control device which controls the ratio $NO/NO_2$ to reduce $NO_x$. A further object of the invention is to provide an exhaust emission control device with a particulate filter which controls the ratio $NO/NO_2$ to reduce $NO_x$.

MEANS OR MEASURES FOR SOLVING THE PROBLEMS

In order to attain the above-mentioned objects, the invention in its first aspect is directed to an exhaust emission control device comprising a selective reduction catalyst incorporated in an exhaust pipe of an engine and capable of selectively reacting $NO_x$ with ammonia even in the presence of oxygen, a pair of differently oxidative oxidation catalysts arranged in parallel with each other and upstream of the selective reduction catalyst, a divided passage for parting of the exhaust gas into the respective oxidation catalysts and for rejoining of the same after passage through the respective oxidation catalysts, exhaust distribution means for adjusting amounts of the exhaust gas distributed to the respective oxidation catalysts with respect to the divided passage such that the ratio $NO/NO_2$ in the exhaust gas is about 1-1.5, urea water addition means for selectively adding the urea water to either upstream or downstream side of the selective reduction catalyst, a first connection pipe branched from the exhaust pipe upstream of the divided passage and connected to the exhaust pipe downstream of the selective reduction catalyst, and a second connection pipe branched from the exhaust pipe at a position between the divided passage and a portion of the exhaust pipe from which a leading end of said first connection pipe is branched and connected to the exhaust pipe downstream of a portion of the exhaust pipe to which a trailing end of the first connection pipe is connected, proper changeover being conducted by passage changeover means between a first passage pattern for causing the exhaust gas from the engine to flow normally through the exhaust pipe and a second passage pattern for causing the exhaust gas from the engine to flow through the first connection pipe and in backflow through the selective reduction catalyst and oxidation catalysts to the second connection pipe.

Thus, in the operation condition with lower exhaust temperature, the first passage pattern is adopted to cause the exhaust gas from the engine to pass normally through the exhaust pipe, the amounts of the exhaust gas distributed to the respective oxidation catalysts being adjusted by the exhaust distribution means so as to make the $NO/NO_2$ ratio in the exhaust gas to about 1-1.5 while the urea water is added by the urea water addition means to an entry side of the selective reduction catalyst, whereby the reducing reaction with higher reaction speed is accelerated by the highly oxidative $NO_2$, leading to effective reduction of $NO_x$. As a result, the reducing reaction occurs even at a temperature area lower than that in usual single use of the selective reduction catalyst, and excessive generation of $NO_2$ at a predetermined exhaust temperature is suppressed by the above-mentioned adjustment of the $NO/NO_2$ ratio to thereby preliminarily prevent falling of the $NO_x$ reduction rate.

If a single oxidation catalyst is arranged upstream of the selective reduction catalyst, a temperature area at which the optimum $NO/NO_2$ ratio for the $NO_x$ reducing reaction is kept would be narrowly defined due to the catalytic characteristic of the single oxidation catalyst. However, adjusted distribution of the exhaust gas to the oxidation catalysts by the exhaust distribution means drastically expands a temperature area at which the optimum $NO/NO_2$ ratio is kept, and substantially enhances the low-temperature activity of the selective reduction catalyst in comparison with use of the single oxidation catalyst.

Falling of the $NO_x$ reduction rate due to excessive generation of $NO_2$ is, however, seen when the selective reduction catalyst has a relatively low catalytic floor temperature. If the catalytic floor temperature is shifted to higher level, the catalytic activity of the selective reduction catalyst is satisfactorily enhanced to make negligible the affection on the $NO_x$ reduction rate by the $NO/NO_2$ ratio, which allows changeover from the first to the second flow pattern by the passage changeover means without impairing the high $NO_x$ reduction rate.

Thus, in a relatively high temperature area where the $NO_x$ reduction rate is less affected by the $NO/NO_2$ ratio, changeover from the first to the second passage pattern is conducted so that the exhaust gas from the engine flows through the first connection pipe and in backflow through the selective reduction catalyst and oxidation catalysts to the second connection pipe while the adding position of the urea water is changed over by the urea water addition means to an entry side of the selective reduction catalyst. As a result, the exhaust gas from the engine is precedently introduced to the selective reduction catalyst; and the ammonia passing through the selective reduction catalyst without reacted is dealt with in the oxidation catalysts and is not discharged as ammonia.

More specifically, the condition of the selective reduction catalyst with a high catalytic floor temperature which allows changeover from the first to the second passage pattern means that the engine is at an operation condition of relatively high engine load. In such operation condition with the selective reduction catalyst being at a relatively high catalytic floor temperature, increase of the load enhances a space velocity (SV: value of inflow fluid volume into a distribution device per unit time divided by fluid volume in the device) of the exhaust gas, so that ammonia tends to pass through the selective reduction catalyst without reacted.

Thus, to adopt the second passage pattern in the operation condition with the selective reduction catalyst being at a high catalytic floor temperature provides a proper countermeasure against the leaking ammonia in the operation condition with ammonia tending to pass through the selective reduction catalyst without reacted. Moreover, in such countermeasure against the leaking ammonia, the oxidation catalysts used in the first passage pattern for adjustment of the $NO/NO_2$ ratio are reutilized to make the leaking ammonia oxidized. Thus, there is no need of arranging a new or additional oxidation catalyst against the leaking ammonia, such no additional arrangement preliminarily preventing the device from being deteriorated in mountability to a vehicle.

In the first aspect of the invention, a temperature sensor for detecting the catalytic floor temperature of the selective reduction catalyst may be provided, the first and second passage patterns being selected when said catalytic floor temperature is determined to be below and beyond a predetermined temperature on the basis of a detection signal from said temperature sensor, respectively.

The invention in its second aspect is directed to an exhaust emission control device comprising a selective reduction catalyst incorporated in an exhaust pipe of an engine and capable of selectively reacting $NO_x$ with ammonia even in the presence of oxygen, urea water addition means for adding urea water as a reducing agent into the exhaust gas on an entry side of said selective reduction catalyst, a plasma generator for discharging electricity into the exhaust gas upstream of the addition of said urea water addition means to generate $NO_2$ and a control unit for controlling said plasma generator for adjustment of $NO/NO_2$ ratio in said exhaust gas and causing said urea water addition means to add the urea water.

In the second aspect of the invention, it is preferable that a revolution sensor for detecting a revolution speed of the engine, a load sensor for detecting a load of the engine and $NO_x$ sensors for detecting $NO_x$ concentration are provided, the plasma generator and/or the urea water addition means being controlled on the basis of detected value from at least one of said revolution sensor, load sensor and $NO_x$ sensors.

It is preferable that the plasma generator adjusts an amount of $NO_2$ generated through control of electric power amount.

Thus, NO in the exhaust gas is oxidized into $NO_2$ by the plasma generator to control the $NO/NO_2$ ratio, so that reduction of $NO_x$ can be satisfactorily conducted even in a case where the urea water is added by the urea water addition means.

By providing the revolution sensor for detecting the revolution speed of the engine, the load sensor for detecting the load of the engine and the $NO_x$ sensors for detecting the $NO_x$ concentrations and by controlling the plasma generator and/or the urea water addition means on the basis of detected value from at least one of said revolution sensor, load sensor and $NO_x$ sensors, the $NO/NO_2$ ratio can be properly detected, so that the plasma generator and/or the urea water addition means can be easily controlled and the reduction of $NO_x$ can be conducted further satisfactorily.

By constructing the plasma generator for adjustment of the amount $NO_2$ generated through control of electric power amount, $NO_2$ can be easily generated for control of the $NO/NO_2$ ratio so that the reduction of $NO_x$ can be conducted still further satisfactorily.

The invention in its third aspect is directed to an exhaust emission control device comprising a selective reduction catalyst incorporated in an exhaust pipe of an engine and capable of selectively reacting $NO_x$ with ammonia even in the presence of oxygen, urea water addition means for adding urea water as a reducing agent into exhaust gas on an entry side of said selective reduction catalyst, a particulate filter arranged upstream of the addition of said urea water addition means for capturing soot in the exhaust gas, a plasma generator arranged upstream of said particulate filter for discharging electricity into the exhaust gas to generate $NO_2$ and a control unit for controlling said plasma generator on a temperature-area to temperature-area basis for adjustment of $NO/NO_2$ ratio in said exhaust gas, for addition of the urea water by said urea water addition means and for oxidation of soot in the particulate filter.

It is preferable that the plasma generator is controlled for oxidation of the soot in the particulate filter while the $NO/NO_2$ ratio is kept in balance.

It is preferable that a revolution sensor for detecting a revolution speed of the engine, temperature sensors for detecting exhaust temperatures and $NO_x$ sensors for detecting $NO_x$ concentrations are provided, the plasma generator being controlled on the basis of detected values from the revolution sensor, temperature sensors and $NO_x$ sensors.

It is preferable that an oxidation catalyst is arranged upstream of the plasma generator.

Thus, NO in the exhaust gas is oxidized by the plasma generator into $NO_2$ for control of the $NO/NO_2$ ratio, so that the reduction of $NO_x$ can be conducted even in the case where the urea water is added by the urea water addition means. Even if the particulate filter is further provided, the $NO/NO_2$ ratio in the exhaust gas is adjusted for oxidation of the soot in the particulate filter through $NO_2$, so that the reduction of $NO_x$ can be conducted while suppressing the affection of the soot in the particulate filter. As the plasma generator is controlled on temperature area to temperature area basis, the reduction of $NO_x$ and oxidation of the soot can be conducted in consideration of the affections in term of temperature in the respective temperature areas.

By controlling the plasma generator for oxidation of the soot in the particulate filter and for keeping the $NO/NO_2$ ratio in balance, the reduction of $NO_x$ can be satisfactorily conducted while further suppressing the affection of the soot in the particulate filter.

By providing the revolution sensor for detecting the revolution speed of the engine, the temperature sensors for detecting the exhaust temperatures and the $NO_x$ sensors for detecting the $NO_x$ concentrations and by controlling the plasma generator on the basis of the detected values from the revolution sensor, temperature sensors and $NO_x$ sensors, proper treatment can be conducted in consideration of the affections by the $NO/NO_2$ ratio and temperatures, so that the plasma generator and/or the urea water addition means can be easily controlled and the reduction of the $NO_x$ can be conducted still further satisfactorily.

By arranging the oxidation catalyst upstream of the plasma generator, $NO_2$ is generated by the oxidation catalyst and fed to the selective reduction catalyst, so that the $NO/NO_2$ ratio can be easily controlled and the reduction of $NO_x$ can be conducted still further satisfactorily.

EFFECTS OF THE INVENTION

According to an exhaust emission control device of the invention in its first aspect, the following excellent features and advantages will be obtained.

(I) In upstream oxidation catalyst arrangement for generation of highly oxidative $NO_2$ to enhance low-temperature activity of the selective reduction catalyst, the paired oxidation catalysts are arranged in parallel with each other and upstream of said selective reduction catalyst, the amounts of the exhaust gas distributed to the respective oxidation catalysts being properly adjusted by the exhaust distribution means, so that the $NO/NO_2$ ratio can be controlled to about 1-1.5 which is optimum for the reducing reaction of $NO_x$. As a result, the excessive generation $NO_2$ can be reliably suppressed to reliably prevent the falling of the $NO_x$ reduction rate, and the low-temperature activity of the selective reduction catalyst can be substantially enhanced in comparison with that in use of the single oxidation catalyst.

(II) As a countermeasure against the leaking ammonia which increases in an operation condition where the $NO_x$ reduction rate is less affected by the $NO/NO_2$ ratio, the changeover from the first to the second passage pattern can be conducted to pass the exhaust gas in backflow through the selective reduction catalyst and respective oxidation catalysts. As a result, the ammonia passing through said selective reduction catalyst without reacted can be dealt with in the respective oxidation catalysts to prevent the ammonia from being discharged outside of a vehicle as it is, which needs no new or additional oxidation catalyst arranged against the leaking ammonia and preliminarily prevents the device from being deteriorated in mountability to the vehicle.

According to an exhaust emission control device of the invention in its second aspect, an excellent effect/advantage obtainable is such that, because of the $NO/NO_2$ ratio being controlled by the plasma generator, the reduction of $NO_x$ can be satisfactorily conducted even if the urea water is added by the urea water addition means.

According to an exhaust emission control device of the invention in its third aspect, an excellent effects/advantages obtainable is such that, because of the $NO/NO_2$ ratio being controlled by the plasma generator, the reduction of $NO_x$ can be conducted even when the urea water is added by the urea water addition means. At the same time, because of the soot of the particulate filter being oxidized by $NO_2$, the affection of the soot in the particulate filter can be suppressed. Moreover, since the plasma generator is controlled on the temperature-area to temperature-area basis, the reduction of $NO_x$ and the oxidation of the soot can be conducted in consideration of the affection in terms of temperature in the respective temperature areas.

EXPLANATION OF THE REFERENCE NUMERALS

Figure 1:
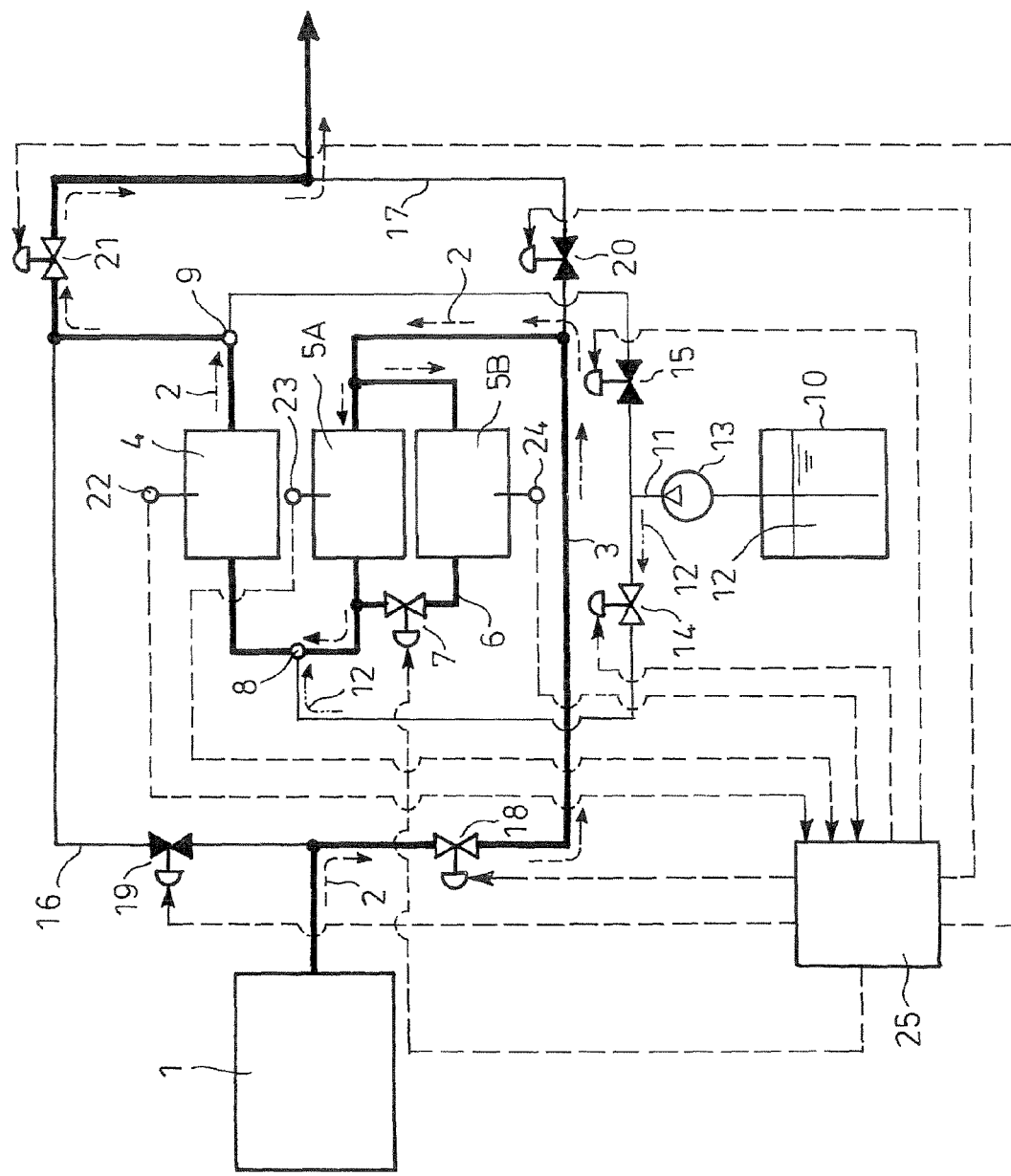
FIG. 1 A block diagram showing an embodiment of the invention in its first aspect.

1 engine
2 exhaust gas
3 exhaust pipe
4 selective reduction catalyst
5A oxidation catalyst
5B oxidation catalyst
6 divided passage
7 valve (exhaust distribution means)
8 injection nozzle (urea water addition means)
9 injection nozzle (urea water addition means)
10 urea water tank (urea water addition means)
11 urea water supply pipe (urea water addition means)
12 urea water
13 supply pump (urea water addition means)
16 first connection pipe
17 second connection pipe
18 valve (passage changeover means)
19 valve (passage changeover means)
20 valve (passage changeover means)
21 valve (passage changeover means)
22 temperature sensor
31 diesel engine (engine)
39 exhaust gas
41 exhaust pipe
46 selective reduction catalyst
51 urea water (reducing agent)
52 urea water addition unit (urea water addition means)
55 plasma generator
58 control unit
59 revolution sensor
59a revolution speed signal (detected value)
60 accelerator sensor (load sensor)
60a load signal (detected value)
61 $NO_x$ sensor
61a detection signal (detected value)
62 $NO_x$ sensor
62a detection signal (detected value)
71 diesel engine (engine)
79 exhaust gas
81 exhaust pipe
86 selective reduction catalyst
91 urea water (reducing agent)
92 urea water addition unit (urea water addition means)
95 plasma generator
98 particulate filter
100 oxidation catalyst
102 control unit
103 revolution sensor
103a revolution speed signal (detected value)
104 accelerator sensor (load sensor)
104a load signal (detected value)
105 $NO_x$ sensor
105a detection signal (detected value)
106 $NO_x$ sensor
106a detection signal (detected value)
107 temperature sensor
107a detection signal (detected value)
108 temperature sensor
108a detection signal (detected value)
109 temperature sensor
109a detection signal (detected value)

BEST MODE FOR CARRYING OUT THE INVENTION

An embodiment of the invention in its first aspect will be described in conjunction with the drawings.

Figure 2:
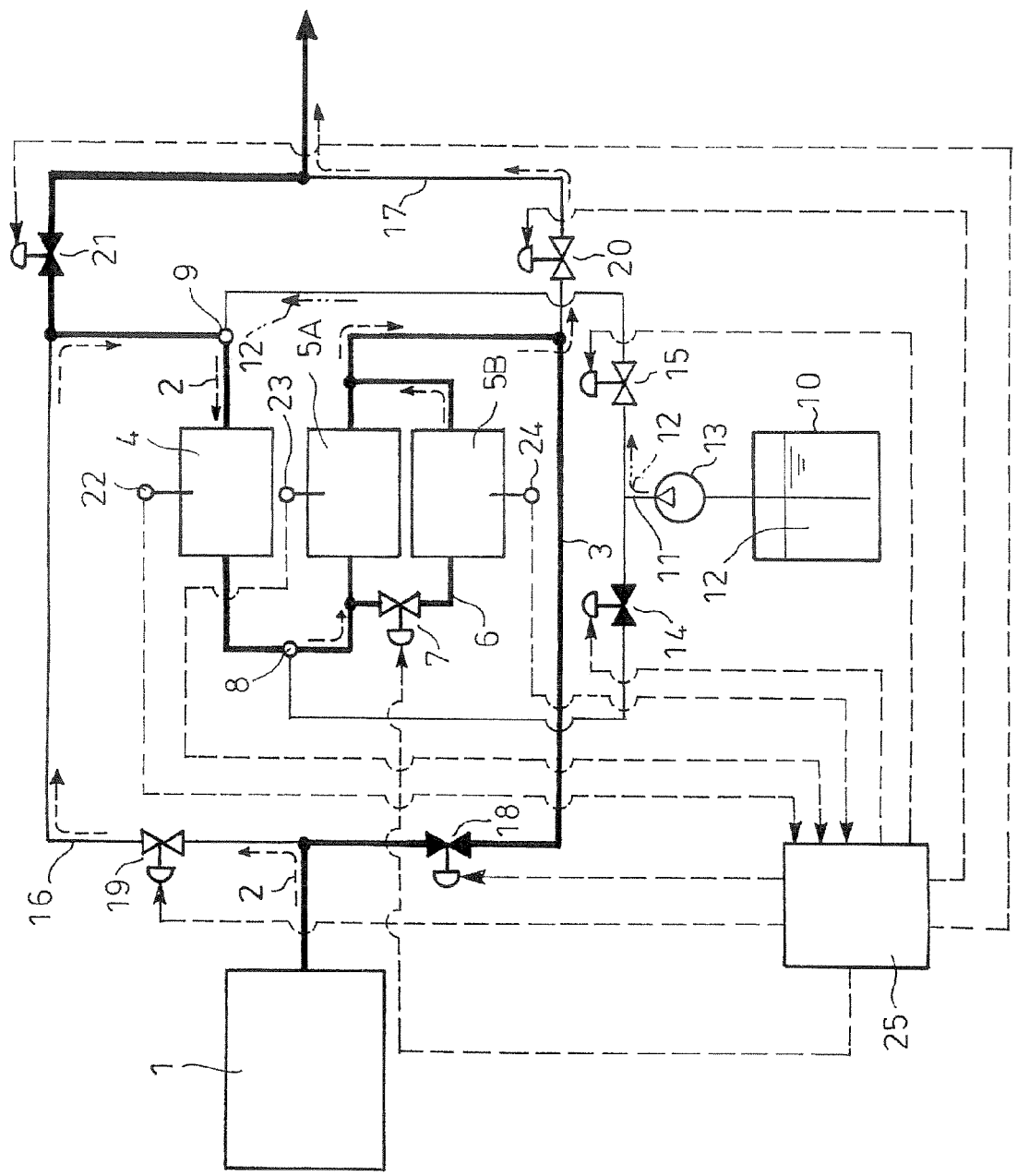
FIG. 2 A block diagram showing changeover from a first passage pattern in FIG. 1 to a second passage pattern.

FIGS. 1 and 2 show the embodiment of the invention in its first aspect. In FIG. 1, reference numeral 1 denotes an engine which is a diesel engine. Exhaust gas 2 discharged from respective cylinders of the engine 1 passes through an exhaust pipe 3 (line shown by thick solid line in the figure; thickness of this line is for distinction between lines, not for indication of differences in passage diameter). Incorporated in the exhaust pipe 3 is a selective reduction catalyst 4 with a feature of selectively reacting $NO_x$ with ammonia even in the presence of oxygen.

Arranged upstream of the selective reduction catalyst 4 and in parallel with each other are two differently NO-oxidative oxidation catalysts 5A and 5B (highly and low NO-oxidative oxidation catalysts 5A and 5B, respectively). The exhaust gas 2 is parted by a divided passage 6 for the oxidation catalysts 5A and 5B and rejoined on an entry side of the selective reduction catalyst 4, a ratio of distributed amounts being controlled by a valve 7 (exhaust distribution means) arranged on one side of the divided passage 6.

Arranged upstream and downstream of the selective reduction catalyst 4 are injection nozzles 8 and 9 for adding a reducing agent into the exhaust gas 2. The nozzles 8 and 9 are connected to a urea water tank 10 arranged at a required site via a bifurcate urea water supply pipe 11 (line shown by thin solid line in FIG. 1). Thus, urea water addition means is constituted by the injection nozzles 8 and 9, urea water tank 10 and urea water supply pipe 11.

Incorporated in the urea water supply pipe 11 is a supply pump 13 which pumps up urea water 12 in the tank 10 as a reducing agent to the nozzles 8 and 9. To open only one of normally closed valves 14 and 15 in the supply pipe 11 causes the urea water 12 to be selectively fed to one of the nozzles 8 and 9.

Further provided are a first connection pipe 16 (line shown by medium solid line in the figure; thickness of this line is for distinction between lines, not for indication of differences in passage diameter) branched from the exhaust pipe 3 upstream of the divided passage 6 and connected to the exhaust pipe 3 downstream of the selective reduction catalyst 4 and a second connection pipe 17 (line shown by medium solid line in the figure; thickness of this line is for distinction between lines, not for indication of differences in passage diameter) branched from the exhaust pipe 3 at a position between the divided passage 6 and a portion of the exhaust pipe 3 from which a leading end of the first connection pipe 16 is branched and connected to the exhaust pipe 3 downstream of a portion of the exhaust pipe 3 to which a trailing end of the first connection pipe 16 is connected. Construction is such that a first passage pattern (see FIG. 1) where the exhaust gas 2 from the engine 1 is passed normally through the exhaust pipe 3 and second passage pattern (see FIG. 2) where the exhaust gas 2 from the engine 1 is passed through the first connection pipe 16 and in backflow through the catalysts 4, 5A and 5B to the second connection pipe 17 are properly switched over by passage changeover means comprising valves 18, 19, 20 and 21.

The catalysts 4, 5A and 5B are provided with temperature sensors 22, 23 and 24 for detection of their catalytic floor temperatures, respectively. Detection signals from the sensors 22, 23 and 24 are inputted into an electronic control unit (ECU) 25 which is an engine controlling computer.

In the control unit 25, control signals are outputted to the valves 18, 19, 20 and 21 on the basis of the detection signal from the temperature sensor 22 such that the first and second passage patterns are selected when the catalytic floor temperature of the catalyst 4 is below and beyond a predetermined temperature, respectively.

Where the first passage pattern is selected in the control unit 25, the valve 14 of the supply pipe 11 is opened by the control signal from the control unit 25 to inject the urea water 12 via the injection nozzle 8; where the second passage pattern is selected in the control unit 25, the valve 15 of the supply pipe 11 is opened by the control signal from the control unit 25 to inject the urea water 12 via the injection nozzle 9.

Since the control unit 25, which takes on control of the engine 1, grasps load and revolution speed of the engine 1 by detection signals from accelerator and revolution sensors (not shown), respectively, then on the basis of current operation condition determined therefrom, opening degree is read from an opening degree control map of the valve 7 so as to make $NO/NO_2$ ratio in the exhaust gas 2 to be about 1-1.5 and is outputted as control signal to the valve 7 so as to control the amounts of the exhaust gas 2 to be distributed to the oxidation catalysts 5A and 5B.

More specifically, if the current operation condition of the engine 1 is grasped, flow rate, temperature and the like of the exhaust gas 2 can be substantially estimated. Thus, determined through crosscheck for example with pretest data is how the $NO/NO_2$ ratio is varied when all of the exhaust gas 2 in the current operation condition is to passed through the highly NO-oxidative oxidation catalyst 5A. Determined further through crosscheck for example with pretest data is on what operation condition the $NO_2$ proportion is beyond the NO proportion and, when the $NO_2$ portion is beyond the NO portion, how degree the exhaust gas 2 is to be distributed to the low NO-oxidative oxidation catalyst 5B so as to keep the $NO/NO_2$ ratio to 1-1.5. Thus, if the opening degree control of the valve 7 is preliminarily set as two-dimensional map on revolution speed, load and the like of the engine 1 for realization of such distribution, then excessive generation of $NO_2$ by the oxidation catalysts can be suppressed by merely reading a required control opening degree from such two-dimensional map on the basis of the revolution speed, load and the like of the engine 1.

In order to determine the opening degree of the valve 7 so as to make the $NO/NO_2$ ratio in the exhaust gas 2 to about 1-1.5, it is preferable that the opening degree of the valve 7 is properly compensated in terms of temperature on the basis of the values actually measured by the temperature sensors 23 and 24 fitted to the respective oxidation catalysts 5A and 5B.

Thus, as shown in FIG. 1, in the operation condition with lower exhaust temperature, the first passage pattern is adopted by the control unit 25 to open and close the valves 18 and 21 and the valves 19 and 20, respectively, to pass the exhaust gas 2 from the engine 1 normally through the exhaust pipe 3. While the amounts of the exhaust gas 2 distributed to the oxidation catalysts 5A and 5B are adjusted by the valve 7 so as to make the $NO/NO_2$ ratio in the exhaust gas 2 to about 1-1.5, the urea water 12 is added by the injection nozzle 8 into entry side of the selective reduction catalyst 4 to thereby accelerate the reducing reaction with higher reaction speed through the highly oxidative $NO_2$, leading to effective reduction of $NO_x$. As a result, the reducing reaction occurs even at a temperature area lower than that in usual single use of the selective reduction catalyst 4; and excessive generation of $NO_2$ at a predetermined exhaust temperature is suppressed by the above-mentioned adjustment of the $NO/NO_2$ ratio to thereby preliminarily prevent falling of the $NO_x$ reduction rate.

If a single oxidation catalyst is arranged upstream of the selective reduction catalyst 4, a temperature area for keeping the $NO/NO_2$ ratio optimum for the $NO_x$ reducing reaction is narrowly defined by the catalytic characteristic of the oxidation catalyst. However, in the invention, the amounts of the exhaust gas 2 to be distributed to the oxidation catalysts 5A and 5B can be adjusted by the valve 7, which drastically expands a temperature area at which the optimum $NO/NO_2$ ratio is kept, and substantially enhances low-temperature activity of the selective reduction catalyst 4 in comparison with use of the single oxidation catalyst.

Falling of the $NO_x$ reduction rate due to excessive generation of $NO_2$ is, however, seen when the selective reduction catalyst 4 has a relatively low catalytic floor temperature. If the catalytic floor temperature is shifted to higher level, the catalytic activity of the catalyst 4 is satisfactorily enhanced to make negligible the affection on the $NO_x$ reduction rate by the $NO/NO_2$ ratio, which allows changeover from the first to the second flow pattern by the valves 18, 19, 20 and 21 without impairing the high $NO_x$ reduction rate.

Thus, as shown in FIG. 2, in a relatively high temperature area where the $NO_x$ reduction rate is less affected by the $NO/NO_2$ ratio, the changeover from the first to the second passage pattern is conducted by the control unit 25 to open the valves 19 and 20 and close the valves 18 and 21, so that the exhaust gas 2 from the engine 1 flows through the first connection pipe 16 and in backflow through the selective reduction catalyst 4 and oxidation catalysts 5A and 5B to the second connection pipe 17 while the valves 15 and 14 are opened and closed by the control unit 25, respectively, to add the urea water 12 via the injection nozzle 9 to entry side of the selective reduction catalyst 4. Thus, the exhaust gas 2 from the engine 1 is precedently introduced to the selective reduction catalyst 4 and the ammonia passing through the selective reduction catalyst 4 without reacted is dealt with at the oxidation catalysts 5A and 5B and is not discharged as ammonia.

More specifically, the condition of the selective reduction catalyst 4 with a high catalytic floor temperature which allows changeover from the first to the second passage pattern means that the engine 1 is at an operation condition with relatively high load. In such operation condition with the selective reduction catalyst 4 having a high catalytic floor temperature, the increase of the load enhances a space velocity (SV: value of inflow fluid volume into a distribution device per unit time divided by fluid volume in the device) of the exhaust gas 2, so that ammonia tends to pass through the selective reduction catalyst 4 without reacted.

Thus, adoption of the second passage pattern in the operation condition with the selective reduction catalyst 4 having a high catalytic floor temperature provides a proper countermeasure against the leaking ammonia in the operation condition with the ammonia tending to pass through the selective reduction catalyst 4 without reacted. Moreover, in such countermeasure against the leaking ammonia, the oxidation catalysts 5A and 5B used in the first passage pattern for adjustment of the $NO/NO_2$ ratio are reutilized to make the leaking ammonia oxidized. Thus, there is no need of arranging a new or additional oxidation catalyst as countermeasure against the leaking ammonia, which preliminarily prevents the device from being deteriorated in mountability to a vehicle.

Thus, according to the above embodiment, in upstream oxidation catalyst arrangement for generation of highly oxidative $NO_2$ to enhance the low-temperature activity of the selective reduction catalyst 4, the paired oxidation catalysts 5A and 5B are arranged in parallel with each other and upstream of the selective reduction catalyst 4, the amounts of the exhaust gas 2 distributed to the respective oxidation catalysts 5A and 5B being properly adjusted by the valve 7 so as to keep the $NO/NO_2$ ratio to about 1-1.5 optimum for the $NO_x$ reducing reaction. As a result, excessive generation of $NO_2$ can be reliably suppressed and falling of the $NO_x$ reduction rate can be reliably prevented; moreover, the low-temperature activity of the selective reduction catalyst 4 can be substantially enhanced in comparison with that in use of the single oxidation catalyst.

Further, as a countermeasure against the leaking ammonia which may increase in the operation condition where the $NO_x$ reduction rate is less affected by the $NO/NO_2$ ratio, the changeover from the first to the second passage pattern can be conducted to pass the exhaust gas 2 through the selective reduction catalyst 4 and in backflow through the oxidation catalysts 5A and 5B, so that the ammonia passing through the selective reduction catalyst 4 without reacted can be treated with by the oxidation catalysts 5A and 5B to prevent the ammonia from being discharged to outside of the vehicle as it is. There is no need of arranging a new or additional oxidation catalyst as countermeasure against the leaking ammonia, which preliminarily prevents the device from being deteriorated in mountability to a vehicle.

It is to be understood that the invention in its first aspect is not limited to the above embodiment and that various changes and modifications may be effected without leaving from the spirit of the invention. For example, the exhaust distribution means may not always be the valve as shown, and may be a valve arranged at a divided or rejoined point of the divided passage or may be valves arranged respectively for the passage and the divided passage therefrom. The temperature sensor for sensing the catalytic floor temperature of the selective reduction catalyst may be substituted by a temperature sensor for sensing the exhaust temperature on entry or discharge side of the selective reduction catalyst as substitutive value for that of the catalytic floor temperature.

Next, an embodiment of the invention in its second aspect will be described in conjunction with the drawings.

Figure 3:
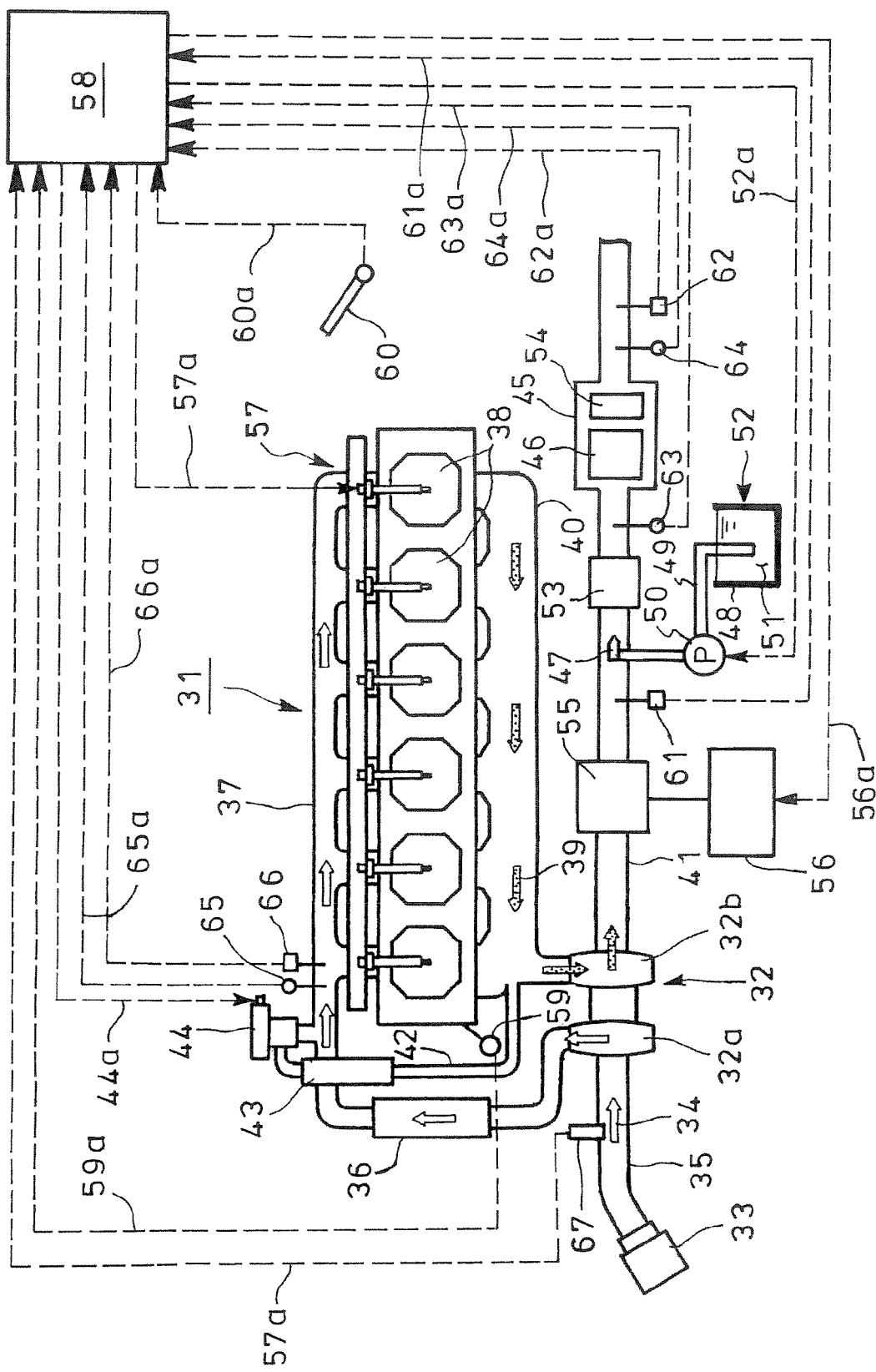
FIG. 3 A schematic view showing an embodiment of the invention in its second aspect.
Figure 4:
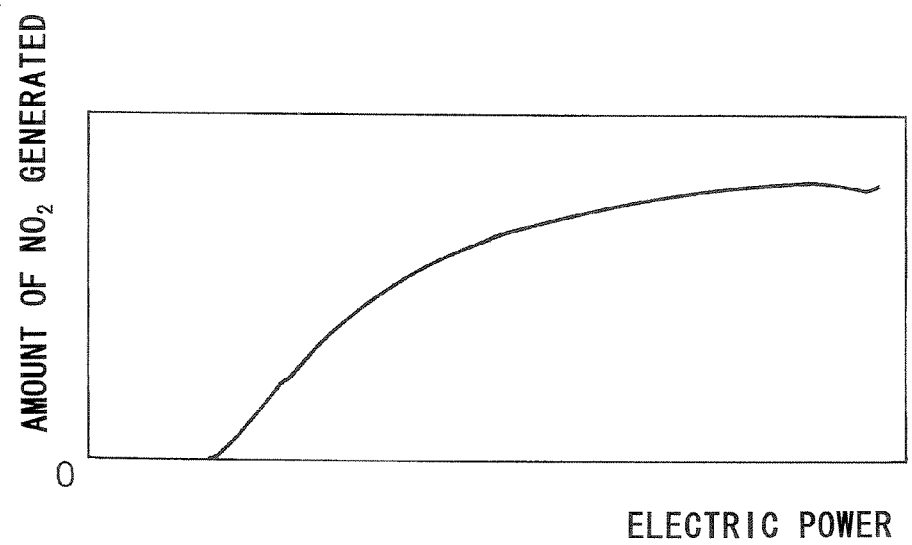
FIG. 4 A graph showing a relationship between electric power and amount of $NO_2$ generated.
Figure 5:
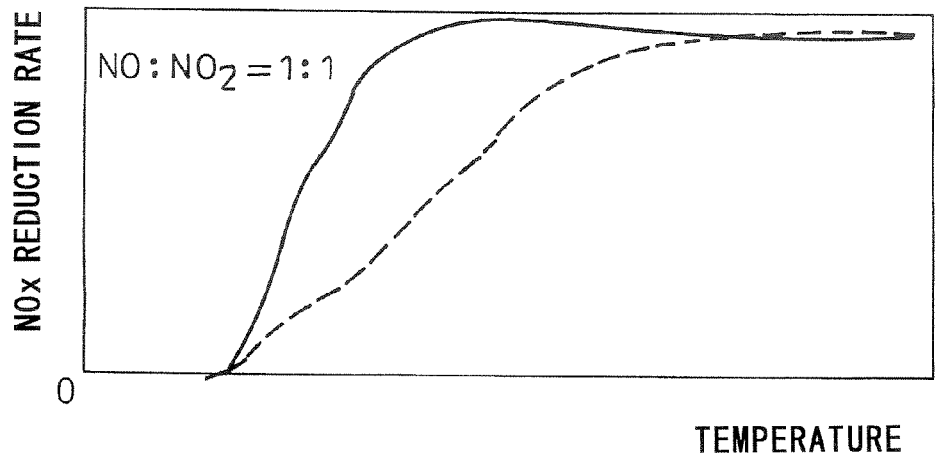
FIG. 5 A graph showing $NO_x$ reduction rate in a case of the ratio $NO/NO_2$ being about 1:1 (solid line) and in a conventional case (dotted line) in comparison.

FIGS. 3 and 4 show the embodiment of the invention in its second aspect. In FIG. 3, reference numeral 31 denotes an engine which is a diesel engine. The engine 31 illustrated is provided with a turbocharger 32 having a compressor 32a to which intake air 34 from an air cleaner 33 is fed via an intake pipe 35. The intake air 34 pressurized in the compressor 32a is further fed to an intercooler 36 where it is cooled. The cooled air 34 from the intercooler 36 is further guided to an intake manifold 37 and is distributed to respective cylinders 38 of the diesel engine 31 (shown in FIG. 3 is a case with inline six cylinders).

Exhaust gas 39 from the cylinders 38 of the diesel engine 31 is fed via an exhaust manifold 40 to a turbine 23b of the turbocharger 32, and the exhaust gas 39 having driven the turbine 32b is discharged via an exhaust pipe 41 to outside of the vehicle.

An end of the exhaust manifold 40 in the direction of row of the cylinders 38 is connected via an EGR pipe 42 to an end of the intake pipe 35 connected to the intake manifold 37, part of the exhaust gas 39 from the exhaust manifold 40 being recirculated to the intake pipe 35 via a water-cooled EGR cooler 43 and an EGR valve 44. The exhaust gas 39 recirculated from the exhaust side to the intake side suppresses the combustion of the fuel in the respective cylinders 38 to lower the combustion temperature and thus reduce the generation of $NO_x$.

Incorporated in the exhaust pipe 41 is a selective reduction catalyst 46 which is encased in a casing 45, is in the form of a flow-through type honeycomb structure and has a characteristic capable of selectively reacting $NO_x$ with ammonia even in the presence of oxygen. The selective reduction catalyst 46 may be a well-known catalyst which may be of precious metal such as platinum or palladium or of base metal such as vanadium oxides, copper oxides or ferrioxide; the catalyst of base metal, which is less oxidative, is preferable in comparison with the catalyst of precious metal, which has tendency of oxidizing $SO_2$ into sulfate.

Arranged in the exhaust pipe 41 and upstream of the casing 45 is an injection nozzle 47 which in turn is connected via a urea water supply line 49 to a urea water tank 48 arranged at an appropriate cite. By driving a supply pump 50 incorporated in the urea water supply line 49, urea water 51 (reducing agent) in the tank 48 can be added via the injection nozzle 47 to upstream side of the selective reduction catalyst 46. A urea water addition unit 52 is constituted by the injection nozzle 47, tank 48, supply line 49 and supply pump 50.

Arranged between an adding position of the urea water 51 by the urea water addition unit 52 (the opening position of the injection nozzle 47) and the casing 45 is a mixer 53 for uniformly dispersing a spray of the urea water 51. Arranged in the casing 45 and just downstream of the selective reduction catalyst 46 is an $NH_3$ slip catalyst 54 for oxidation treatment of the surplus ammonia as countermeasure against the leaking ammonia.

Arranged in the exhaust pipe 41 and upstream of the adding position of the urea water 51 (the opening position of the injection nozzle 47) is a plasma generator 55 which discharges electricity in the exhaust gas 39 to generate plasma. The plasma generator 55 comprises a plurality of electrodes (not shown) connected to a power supply 56 and arranged opposedly to one another for electric discharge therebetween, NO being oxidized into $NO_2$ by the plasma generated. An amount of $NO_2$ generated may be controlled by adjusting electric power amount for generating the plasma as shown in FIG. 4.

The plasma generator 55 is an ON-OFF switch with an electric or mechanical contact so as to make it easy to control the power supply for generation of plasma. Changeover just like pulsation may be conducted; in this case, with voltage applied being made constant, switching interval is controlled to adjust a quantity of electricity to thereby generate the plasma. The power supply 56 may be a DC, high-frequency or pulsed power supply. In order to enhance the $NO_2$ generation rate, it is preferable that each of the electrodes is applied with an oxidation catalyst, and dielectric (not shown) applied with oxidation catalyst is sandwiched between the electrodes. It is also preferable that the power supply 56 for the plasma generator 55 has a built-in computer which makes it possible to supply electric power as instructed. The electrodes of the plasma generator 55 may be of various shapes such as plates, rods or cylinders, provided that distance between the electrodes can be set substantially uniform.

The plasma generator 55, the urea water addition unit 52, the EGR valve 44 for recirculation of the exhaust gas 39 and a fuel injection unit 57 for injecting the fuel to the respective cylinders 38 are actuated by command signals 56a, 52a, 44a and 57a, respectively, from an electronic control unit 58 (ECU) which is an engine-controlling computer.

Inputted into the control unit 58 are a revolution speed signal 59a from a revolution sensor 59 for the engine 31, a load signal 60a from an accelerator sensor 60 (load sensor) which detects an accelerator stepped-in degree as load to the engine 31, detection signals 61a and 62a from $NO_x$ sensors 61 and 62 for detecting $NO_x$ concentrations in the exhaust gas 39 at a position between the plasma generator 55 and the adding position of the urea water 51 and at a proper position downstream of the casing 45, respectively, detection signals 63a and 64a from temperature sensors 63 and 64 for detecting exhaust temperatures on entry and discharge sides of the casing 45, respectively, a detection signal 65a from a temperature sensor 65 for detecting intake temperature on an entry side of the intake manifold 37, a detection signal 66a from a supercharging-pressure sensor 66 for detecting supercharging pressure on the entry side of the intake manifold 37 and a detection signal 67a from an air flow meter 67 which measures intake air quality between the air cleaner 33 and the compressor 32a. In the control unit 58, a detection signal from an outside air temperature sensor (not shown) arranged outside may be inputted.

Next, mode of operation of the invention in its second aspect will be disclosed.

When $NO_x$ in the exhaust gas 39 is to be purified, firstly the current revolution speed of the engine 31 is read on the basis of the revolution speed signal 59a from the sensor 59 and the current fuel injection amount is determined on the basis of the load signal 60a from the sensor 60. Further, temperature, flow rate, NO, $N_2$ and $O_2$ concentrations are determined on the basis of the detection signals 61a and 62a from the $NO_x$ sensors 61 and 62 and the detection signals 63a and 64a from the temperature sensors 63. The revolution sensor 59, accelerator sensor 60, $NO_x$ sensors 61 and 62, temperature sensors 63 and 64 and the like can cope with any changes of temperature, flow rate, NO, $N_2$ and $O_2$ concentrations and the like associated with change in operation condition of the engine 31 since they conduct detection as needed basis so as to update the data. When the exhaust gas 39 is recirculated by the EGR valve 44, the amount of $NO_2$ at the outlet of the engine 31 may vary, which can be also coped with by updating the data.

After the temperature, flow rate, No, $N_2$ and $O_2$ concentrations and the like are determined, how degree $NO_2$ is to be generated to make the $NO/NO_2$ ratio in the exhaust gas 39 to about 1:1 is determined by the control unit 58, using the map or the like. Then, the electric power of the plasma generator 55 is adjusted to generate plasma to thereby oxidize a required amount of NO into $NO_2$.

Generation of $NO_2$ by the plasma generator 55 is dealt with by the function:

generation of $NO_2$=f(plasma energy, temperature, flow rate and NO, $N_2$ and $O_2$ concentrations)   Equation 1

The temperature, flow rate and NO, $N_2$ and $O_2$ concentrations may vary depending upon operation condition of the engine 31, so that plasma energy is properly adjusted for production of $NO_2$.

The plasma energy is determined by the function:

plasma energy=f(electric power, distance between electrode plates, permittivity (dielectric))   Equation 2 and the distance between electrode plates and the permittivity (dielectric) depend on setting of the device and are invariable.

The electric power is determined by the function:

electric power=f(applied voltage, frequency (current amount))   Equation 3

Thus, plasma energy may be controlled by varying voltage and frequency. The power supply may be a high-frequency or pulsed power supply.

As a result, the generated $NO_2$ amount is dependent upon adjustment of electric power, i.e., adjustment of voltage and frequency (current amount) in conformity with temperature, flow rate and NO, $N_2$ and $O_2$ concentrations.

After NO is oxidized into $NO_2$ by the plasma generator 55 to attain the $NO/NO_2$ ratio in the exhaust gas 39 into about 1:1, the added amount of the urea water 51 is calculated by the detection signals 61a and 62a from the $NO_x$ sensors 61 and 62; and the fact that the exhaust temperature is within the active temperature area of the selective reduction catalyst 46 is verified by the detection signals 63a and 64a from the temperature sensors 63 and 64. Then, the urea water 51 is injected from the injection nozzle 47 of the urea water addition unit 52 on the basis of the command signal 52a from the control unit 58, thereby reducing $NO_x$.

Thus, with the exhaust emission control device constructed as mentioned above, NO in the exhaust gas 39 is oxidized into $NO_2$ by the plasma generator 55 to control the $NO/NO_2$ ratio, so that the reduction of $NO_x$ can be properly conducted through addition of the urea water 51 by the urea water 51 addition means.

By constructing such that provided are the revolution sensor 59 for detecting the revolution speed of the engine 31, the accelerator sensor 60 (load sensor) for detecting load of the engine 31 and the $NO_x$ sensors 61 and 62 for detecting the $NO_x$ concentrations and that the plasma generator 55 and/or urea water 51 addition means is controlled on the basis of at least one of the revolution speed, load and detection signals 59a, 60a, 61a and 62a (detected values) from the sensors 59, 60, 61 and 62, the $NO/NO_2$ ratio can be properly detected to easily control the plasma generator 55 and/or urea water 51 addition means, thereby properly conducting reduction of $NO_x$.

Further, by constructing the plasma generator 55 such that the generated $NO_2$ amount is adjusted by controlling the amount of electric power, the production of $NO_2$ is simplified to control the $NO/NO_2$ ratio, whereby reduction of $NO_x$ can be properly conducted.

It is to be understood that the invention in its second aspect is not limited to the above embodiment and that various changes and modifications may be made without leaving the spirit of the invention. For example, there are no restrictions on how to generate plasma and details of $NO_x$ treatment, provided that NO is oxidized into $NO_2$ by plasma to control the $NO/NO_2$ ratio. The plasma generator and the urea water addition device may be controlled by command signals from other sensors.

Next, an embodiment of the invention in its third aspect will be described in conjunction with the drawings.

Figure 6:
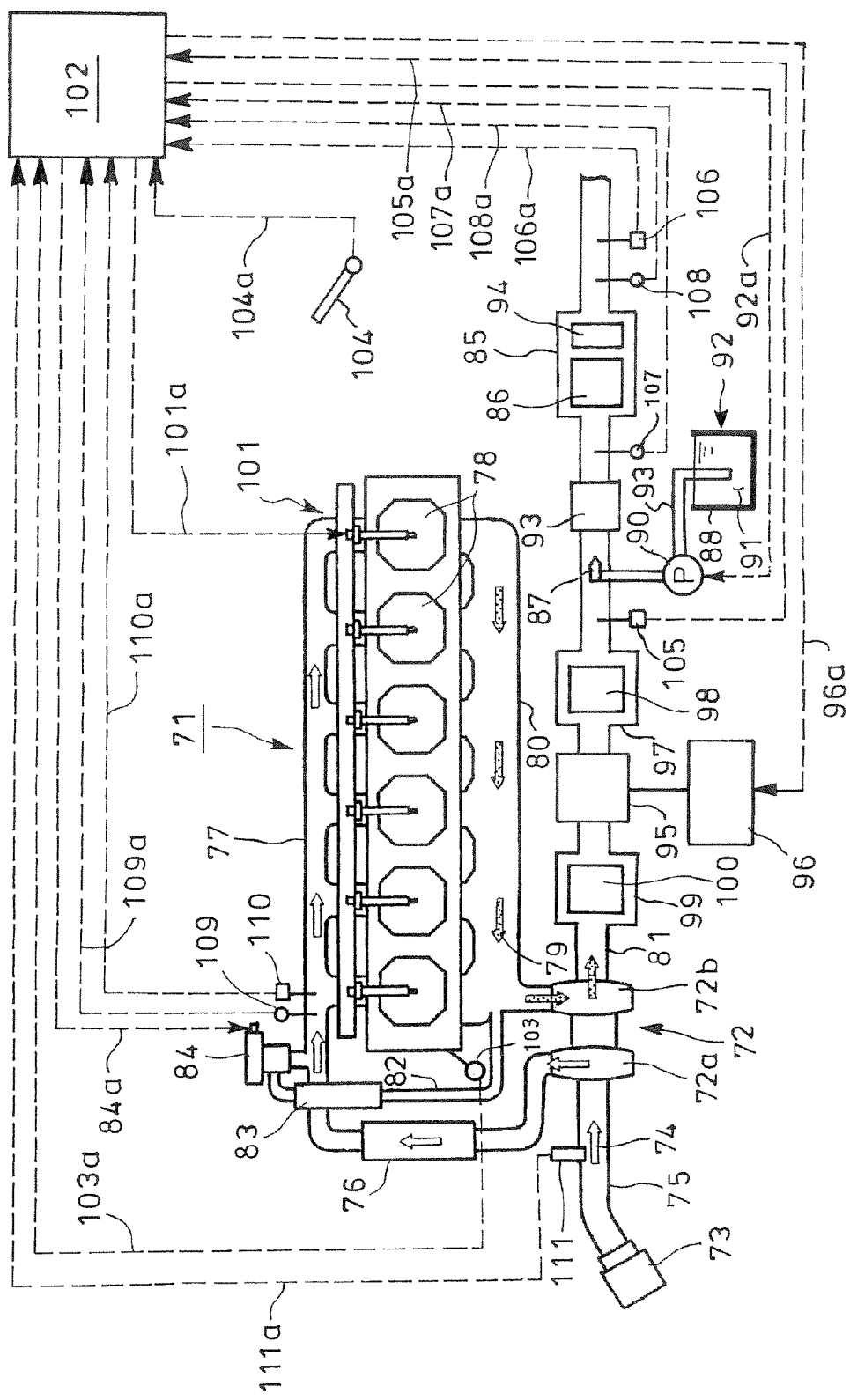
FIG. 6 A schematic view showing an embodiment of the invention in its third aspect.

FIGS. 6-9 show the embodiment of the invention in its third aspect. In FIG. 6, reference numeral 71 denotes an engine which is a diesel engine. The engine 71 illustrated is provide with a turbocharger 72 having a compressor 72a to which intake air 74 from an air cleaner 73 is fed via an intake pipe 75. The intake air 74 pressurized in the compressor 72a is further fed to an intercooler 76 where it is cooled. The cooled air 74 from the intercooler 76 is further guided to an intake manifold 77 and is distributed to respective cylinders 78 of the diesel engine 71 (shown in FIG. 6 is a case with inline six cylinders).

Exhaust gas 79 from the cylinders 78 of the diesel engine 71 is fed via an exhaust manifold 80 to a turbine 72b of the turbocharger 72, and the exhaust gas 79 having driven the turbine 72b is discharged via an exhaust pipe 81 to outside of the vehicle.

An end of the exhaust manifold 80 in the direction of row of the cylinders 78 is connected via an EGR pipe 82 to an end of the intake pipe 75 connected to the intake manifold 77, part of the exhaust gas 79 from the exhaust manifold 80 being recirculated to the intake pipe 75 via a water-cooled EGR cooler 83 and an EGR valve 84. The exhaust gas 79 recirculated from the exhaust side to the intake side suppresses the combustion of the fuel in the respective cylinders 78 to lower the combustion temperature and thus reduce the generation of $NO_x$.

Incorporated in the exhaust pipe 81 is a selective reduction catalyst 86 which is encased in a casing 85, is in the form of a flow-through type honeycomb structure and has a characteristic capable of selectively reacting $NO_x$ with ammonia even in the presence of oxygen. The selective reduction catalyst 86 may be a well-known catalyst which may be of precious metal such as platinum or palladium or of base metal such as vanadium oxides, copper oxides or ferrioxide; the catalyst of base metal, which is less oxidative, is preferable in comparison with the catalyst of precious metal, which has tendency of oxidizing $SO_2$ into sulfate.

Arranged in the exhaust pipe 81 and upstream of the casing 85 is an injection nozzle 87 which in turn is connected via a urea water supply line 89 to a urea water tank 88 arranged at an appropriate cite. By driving a supply pump 90 incorporated in the urea water supply line 89, urea water 91 (reducing agent) in the tank 88 can be added via the injection nozzle 87 to upstream side of the selective reduction catalyst 86. A urea water addition unit 92 is constituted by the injection nozzle 87, tank 88, supply line 89 and supply pump 90.

Arranged between an adding position of the urea water 91 by the urea water addition unit 92 (the opening position of the injection nozzle 87) and the casing 85 is a mixer 93 for uniformly dispersing the spray of the urea water 91. Arranged in the casing 85 and just downstream of the selective reduction catalyst 86 is an $NH_3$ slip catalyst 94 for oxidation treatment of the surplus ammonia as countermeasure against the leaking ammonia.

Figure 7:
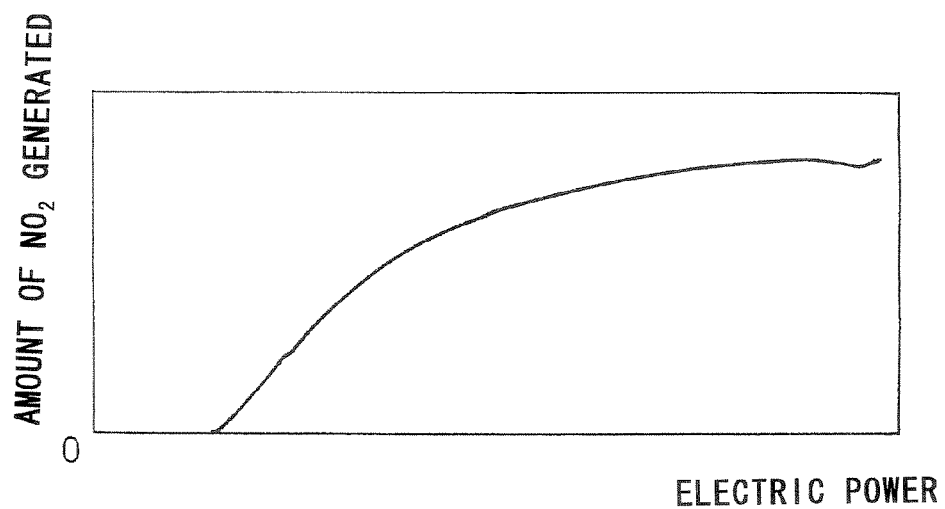
FIG. 7 A graph showing a relationship between electric power and amount of $NO_2$ generated.

Arranged in the exhaust pipe 81 and upstream of the adding position of the urea water 91 (the opening position of the injection nozzle 87) is a plasma generator 95 which discharges electricity in the exhaust gas 79 to generate plasma. The plasma generator 95 comprises a plurality of electrodes (not shown) connected to a power supply 96 and arranged oppositely to one another for electric discharge therebetween, NO being oxidized into $NO_2$ by the plasma generated. An amount of $NO_2$ generated may be controlled by adjusting electric power amount for generating the plasma as shown in FIG. 7.

The plasma generator 95 is an ON-OFF switch with an electric or mechanical contact so as to make it easy to control the power supply for generation of plasma. Changeover just like pulsation may be conducted; in this case, with voltage applied being made constant, switching interval is controlled to adjust a quantity of electricity to thereby generate the plasma. The power supply 96 may be a DC, high-frequency or pulsed power supply. In order to enhance the $NO_2$ generation ratio, it is preferable that each of the electrodes is applied with an oxidation catalyst, and dielectric (not shown) applied with oxidation catalyst is sandwiched between the electrodes. It is also preferable that the power supply 56 for the plasma generator 95 has a built-in computer which makes it possible to supply electric power as instructed. The electrodes of the plasma generator 95 may be of various shapes such as plates, rods or cylinders, provided that distance between the electrodes can be set substantially uniform.

Further arranged in the exhaust pipe 81 and between the plasma generator 95 and the adding position of the urea water 91 (the opening position of the injection nozzle 87) is a particulate filter 98 encased by the casing 97. The particulate filter 98 is constituted by a porous honeycomb structure made of ceramics such as cordierite and having lattice-like compartmentalized passages; alternate ones of the passages have plugged inlets and the remaining passages with unplugged open inlets are plugged at their outlets. Thus, only the exhaust gas passing through thin porous walls compartmentalizing the respective passages is discharged downstream.

Further arranged in the exhaust pipe 81 and between the plasma generator 95 and the turbine 72b of the turbocharger 72 is an oxidation catalyst 100 which is encased by a casing 99 and is arranged upstream of the plasma generator 95 so as to enhance the low-temperature activity of the selective reduction catalyst 86. The oxidation catalyst 100 is of a structure made of platinum mixed with aluminum oxide (alumina) and carried by for example a metal carrier made of stainless steel. The oxidation catalyst and the plasma generator 95 may be separately arranged as shown in FIG. 6. Alternately, the oxidation catalyst may be attached to the plasma generator 95 into the plasma generator with the oxidation catalyst; alternatively, they may be combined with the particulate filter 98 into the plasma generator with the oxidation catalyst and with the particulate filter (plasma DPF with the oxidation catalyst).

The plasma generator 95, the urea water addition unit 92, the EGR valve 84 for recirculation of the exhaust gas 79 and a fuel injection unit 101 for injecting the fuel to the respective cylinders 78 are actuated by command signals 96a, 92a, 84a and 110a, respectively, from an electronic control unit 102 (ECU) which is an engine-controlling computer.

Inputted into the control unit 102 are a revolution speed signal 103a from a revolution sensor 103 for the engine 71, a load signal 104a from an accelerator sensor 104 (load sensor) which detects an accelerator stepped-in degree as loads to the engine 71, detection signals 105a and 106a from $NO_x$ sensors 105 and 106 for detecting $NO_x$ concentrations in the exhaust gas 79 at a position between the casing 97 and the adding position of the urea water 91 and at a proper position downstream of the casing 85, respectively, detection signals 107a and 108a from temperature sensors 107 and 108 for detecting the exhaust temperature on entry and discharge sides of the casing 85, respectively, a detection signal 109a from a temperature sensor 109 for detecting intake temperature on the entry side of the intake manifold 77, a detection signal 110a from a supercharging-pressure sensor 110 for detecting supercharging pressure on entry side of the intake manifold 77 and a detection signal 111a from an air flow meter 111 for measuring intake air amount between the air cleaner 73 and the compressor 72a. In the control unit 102, a detection signal from an outside air temperature sensor (not shown) arranged outside may be inputted.

Next, mode of operation of the invention in its third aspect will be described.

Figure 8:
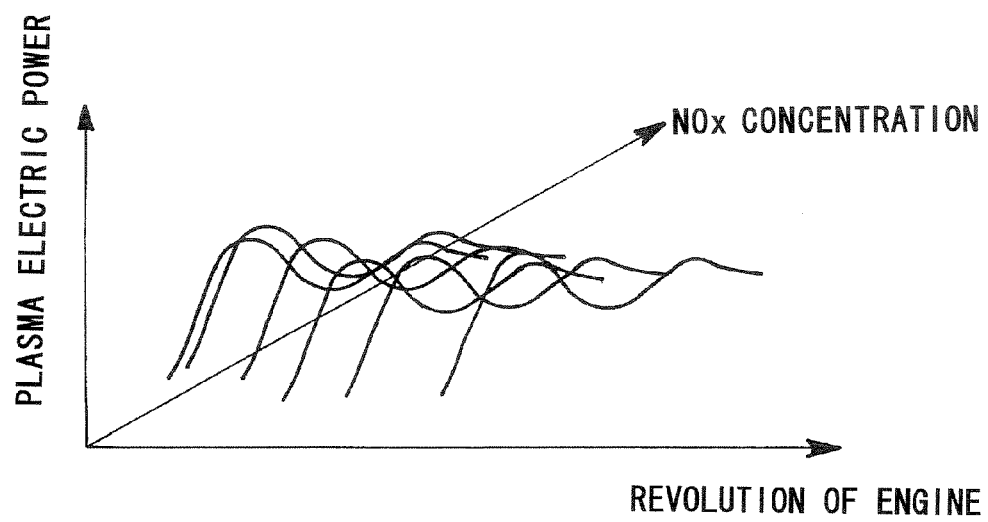
FIG. 8 A conceptual diagram showing a 3D map for determination of plasma electric power.

When $NO_x$ in the exhaust gas 79 is to be purified, firstly the current revolution speed of the engine 71 is read on the basis of the revolution speed signal 103a from the sensor 103 and the $NO_x$ concentrations are read on the basis of the detection signals 105a and 106 from the $NO_x$ sensors 105 and 106. Further, the temperatures of the exhaust gas are read on the basis of the detection signals 107a and 108a from the temperature sensors 107 and 108. By a 3D map (three-dimensional map) as shown in FIG. 8 constituted by engine revolution speed, $NO_x$ concentration and exhaust temperature, plasma electric power for generating the plasma is determined in the plasma generator 95.

The determined plasma electric power is controlled by the control unit differently on a temperature-area to temperature-area basis. An example of control with respect to specific temperature areas will be described. Temperature areas divided are a temperature area from a lower limit temperature to 130° C. (temperature area I in FIG. 9), a temperature area from 130° C. to 180° C. (temperature area II in FIG. 9), a temperature area from 180° C. to 270° C. (temperature area III in FIG. 9), a temperature area from 270° C. to 450° C. (temperature area IV in FIG. 9), a temperature area from 450° C. to 600° C. (temperature area V in FIG. 9) and a temperature area from 600° C. to an upper limit temperature (temperature area VI in FIG. 9).

Figure 9:
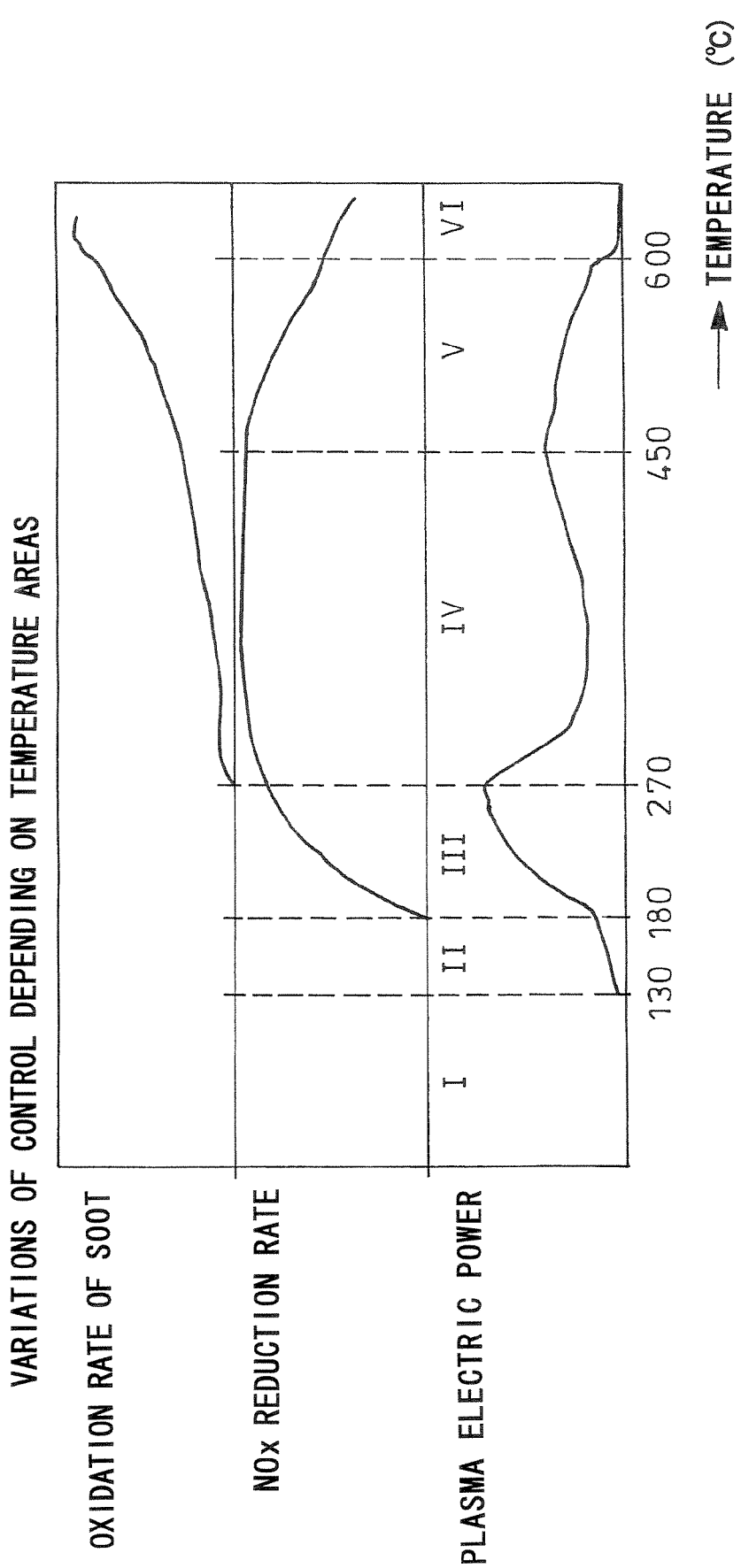
FIG. 9 A graph showing changes in control on a temperature-area to temperature-area basis.

The temperature area from the lower limit temperature to 130° C. (temperature area I in FIG. 9) is a region where any plasma generated by the plasma generator 95 does not contribute to reduction of $NO_x$; in the region, no electric power is fed. The temperature area from 130° C. to 180° C. (temperature area II in FIG. 9) is a region where, just like the above temperature area, any plasma generated by the plasma generator 95 does not contribute to reduction of $NO_x$; but, in the region, electric power is fed to keep the exhaust gas to a predetermined temperature for attainment of the selective reduction catalyst 86 within an active temperature area through heat generated by the plasma. The temperature area from 180° C. to 270° C. (temperature area III in FIG. 9) is a region where no oxidation of the soot is required, but the urea water 91 is required to be added by the urea water addition unit 92 to improve the reduction of $NO_x$; in the region, electric power is fed to generate $NO_2$ through the plasma generator 95 for the reduction of $NO_x$. The temperature area from 270° C. to 450° C. (temperature area IV in FIG. 9) is a region where, though $NO_2$ may be generated less against the selective reduction catalyst 86 having high activity there, the soot must be oxidized; in the region, electric power is fed to generate $NO_2$ through the plasma generator 95 so as to oxidize the soot through $NO_2$. As shown in FIG. 9, less electric power will do in the temperature area from 270° C. to 450° C. than in the temperature area from 180° C. to 270° C. The temperature area from 450° C. to 600° C. (temperature area V in the figure) is a region where, though the selective reduction catalyst 86 is further high activity and no generation of $NO_2$ is required, the soot must be reliably oxidized; in the region, electric power is fed to generate $NO_2$ through the plasma generator 95 so as to accelerate the oxidation of the soot by $NO_2$. The temperature area from 600° C. to the upper limit temperature (temperature area VI in the figure) is a region where the soot is oxidized spontaneously and no $NO_2$ is required; in the region, no electric power is fed.

In these temperature areas, $NO_2$ is properly generated by the plasma generator. A specific example will be described with respect to the temperature area from 180° C. to 270° C. (temperature area III in the figure). Upon generation of $NO_2$ by the plasma generator 95, the current revolution speed of the engine 71 is read on the basis of the revolution speed signal 103a from the revolution sensor 103 and the current fuel injection amount is determined on the basis of the load signal 104a from the accelerator sensor 104. Further, temperature, flow rate, NO, $N_2$ and $O_2$ concentrations and the like are determined on the basis of the detection signals 105a and 106a from the $NO_x$ sensors 105 and 106, the detection signals 107a and 108a from the temperature sensors 107 and 108 and the like. The revolution sensor 103, accelerator sensor 104, $NO_x$ sensors 105 and 106, temperature sensors 107 and 108 and the like can cope with any changes of temperature, flow rate, NO, $N_2$ and $O_2$ concentrations and the like associated with change in operation condition of the engine 71 since they make detection as needed basis to update the data. When the exhaust gas 79 is recirculated by the EGR valve 84, the amount of $NO_2$ at the outlet of the engine 71 may vary, which can be also coped with by updating the data.

After the temperature, flow rate, NO, $N_2$ and $O_2$ concentrations and the like are determined, how degree $NO_2$ is to be generated to make the $NO/NO_2$ ratio in the exhaust gas 79 to about 1:1 is determined by the control unit 102 via the detection signals (detected values) 105a and 106a from the $NO_x$ sensors 105 and 106 or using the map into which the revolution speed and accelerator stepped-in degree (fuel injection amount) of the engine 71 are inputted. Then, the electric power of the plasma generator 95 is adjusted to generate plasma to thereby oxidize a required amount of NO into $NO_2$.

Generation of $NO_2$ by the plasma generator 95 is dealt with by the function:

generation of $NO_2$=f(plasma energy, temperature, flow rate and NO, $N_2$ and $O_2$ concentrations)   Equation 4

The temperature, flow rate and NO, $N_2$ and $O_2$ concentrations may vary depending upon operation condition of the engine 71, so that plasma energy is properly adjusted for production of $NO_2$.

The plasma energy is determined by the function:

plasma energy=f(electric power, distance between electrode plates, permittivity (dielectric))   Equation 5 and the distance between electrode plates and the permittivity (dielectric) depend on setting of the device and are invariable.

The electric power is determined by the function:

electric power=f(applied voltage, frequency (current amount))   Equation 6

Thus, plasma energy may be controlled by varying voltage and frequency. The power supply may be high-frequency or pulsed power supply.

As a result, the generated $NO_2$ amount is dependent upon adjustment of electric power, i.e., adjustment of voltage and frequency (current amount) in conformity with temperature, flow rate and NO, $N_2$ and $O_2$ concentrations.

After NO is oxidized into $NO_2$ by the plasma generator 95 to attain the $NO/NO_2$ ratio in the exhaust gas 79 into about 1:1, the added amount of the urea water 91 is calculated by the detection signals 105a and 106a from the $NO_x$ sensors 105 and 106; and the fact that the exhaust temperature is within the active temperature area of the selective reduction catalyst 86 is verified by the detection signals 107a and 108a from the temperature sensors 107 and 108. Then, the urea water 91 is injected from the injection nozzle 87 of the urea water addition unit 92 on the basis of the command signal 92a from the control unit 102, thereby reducing $NO_x$.

Thus, with the exhaust emission control device constructed as mentioned above, NO in the exhaust gas is oxidized into $NO_2$ by the plasma generator 95 to control the $NO/NO_2$ ratio, so that the reduction of $NO_x$ can be properly conducted through addition of urea water by the urea water addition unit 92. Even in a situation that the particulate filter 98 is further provided, the $NO/NO_2$ ratio in the exhaust gas is adjusted through division into the temperature areas to oxidize the soot of the particulate filter 98 by $NO_2$, so that the affection of the particulate filter 98 is suppressed and the reduction of $NO_x$ can be conducted. Since the plasma generator 95 is controlled on the temperature-area to temperature-area basis, the reduction of $NO_x$ and the oxidation of the soot can be conducted in consideration of the affection of temperature in the respective temperature areas, and electric power to be consumed can be reduced.

By constructing the plasma generator 95 such that the soot in the particulate filter 98 is oxidized and the $NO/NO_2$ ratio is kept in balance, the affection of the soot in the particulate filter 98 can be further suppressed and the reduction of the $NO_x$ can be properly conducted.

By constructing such that provided are the revolution sensor 103 for detecting the revolution speed of the engine 71, the temperature sensors 107 and 108 for detecting the temperatures of the exhaust gas and the $NO_x$ sensors 105 and 106 for detecting the $NO_x$ concentration and that the plasma generator 95 is controlled on the basis of detected values from the revolution sensor 103, temperature sensors 107 and 108 and $NO_x$ sensors 105 and 106, proper treatment can be conducted in consideration of the affections by the $NO/NO_2$ ratio and temperature. As a result, the plasma generator 95 and/or urea water addition unit 92 can be easily controlled and the reduction of $NO_x$ can be further properly conducted.

By providing the oxidation catalyst 100 upstream of the plasma generator 95, $NO_2$ being generated by the oxidation catalyst 100 and fed to the selective reduction catalyst 86, the $NO/NO_2$ ratio can be easily controlled and the reduction of $NO_x$ can be further properly conducted.

It is to be understood that the invention in its third aspect is not limited to the above-mentioned embodiment and that various changes and modifications may be made without departing from the spirit of the invention. For example, there are no restrictions on how to generate plasma and details of $NO_x$ treatment, provided that NO is oxidized into $NO_2$ by plasma to control the $NO/NO_2$ ratio. The plasma generator and the urea water addition device may be controlled by command signals from other sensors.

The invention claimed is:

1. An exhaust emission control device comprising a selective reduction catalyst incorporated in an exhaust pipe of an engine and capable of selectively reacting $NO_x$ with ammonia even in the presence of oxygen, a pair of differently oxidative oxidation catalysts arranged in parallel with each other and upstream of the selective reduction catalyst, a divided passage for parting of the exhaust gas into the respective oxidation catalysts and for rejoining of the same after passage through the respective oxidation catalysts, exhaust distribution means for adjusting amounts of the exhaust gas distributed to the respective oxidation catalysts with respect to the divided passage such that the $NO/NO_2$ ratio in the exhaust gas is about 1-1.5, urea water addition means for selectively adding the urea water to either upstream or downstream side of the selective reduction catalyst, a first connection pipe branched from the exhaust pipe upstream of the divided passage and connected to the exhaust pipe downstream of the selective reduction catalyst, and a second connection pipe branched from the exhaust pipe at a position between the divided passage and a portion of the exhaust pipe from which a leading end of said first connection pipe is branched and connected to the exhaust pipe downstream of a portion of the exhaust pipe to which a trailing end of the first connection pipe is connected, proper changeover being conducted by passage changeover means between a first passage pattern for causing the exhaust gas from the engine to flow normally through the exhaust pipe and a second passage pattern for causing the exhaust gas from the engine to flow through the first connection pipe and in backflow through the selective reduction catalyst and oxidation catalysts to the second connection pipe.

2. An exhaust emission control device as claimed in claim 1, further comprising a temperature sensor for detecting a catalytic floor temperature of the selective reduction catalyst, the first and second passage patterns being selected on the basis of a detection signal of said temperature sensor when said catalytic floor temperature is below and beyond a predetermined temperature, respectively.

* * * * *